UNITED STATES PATENT OFFICE.

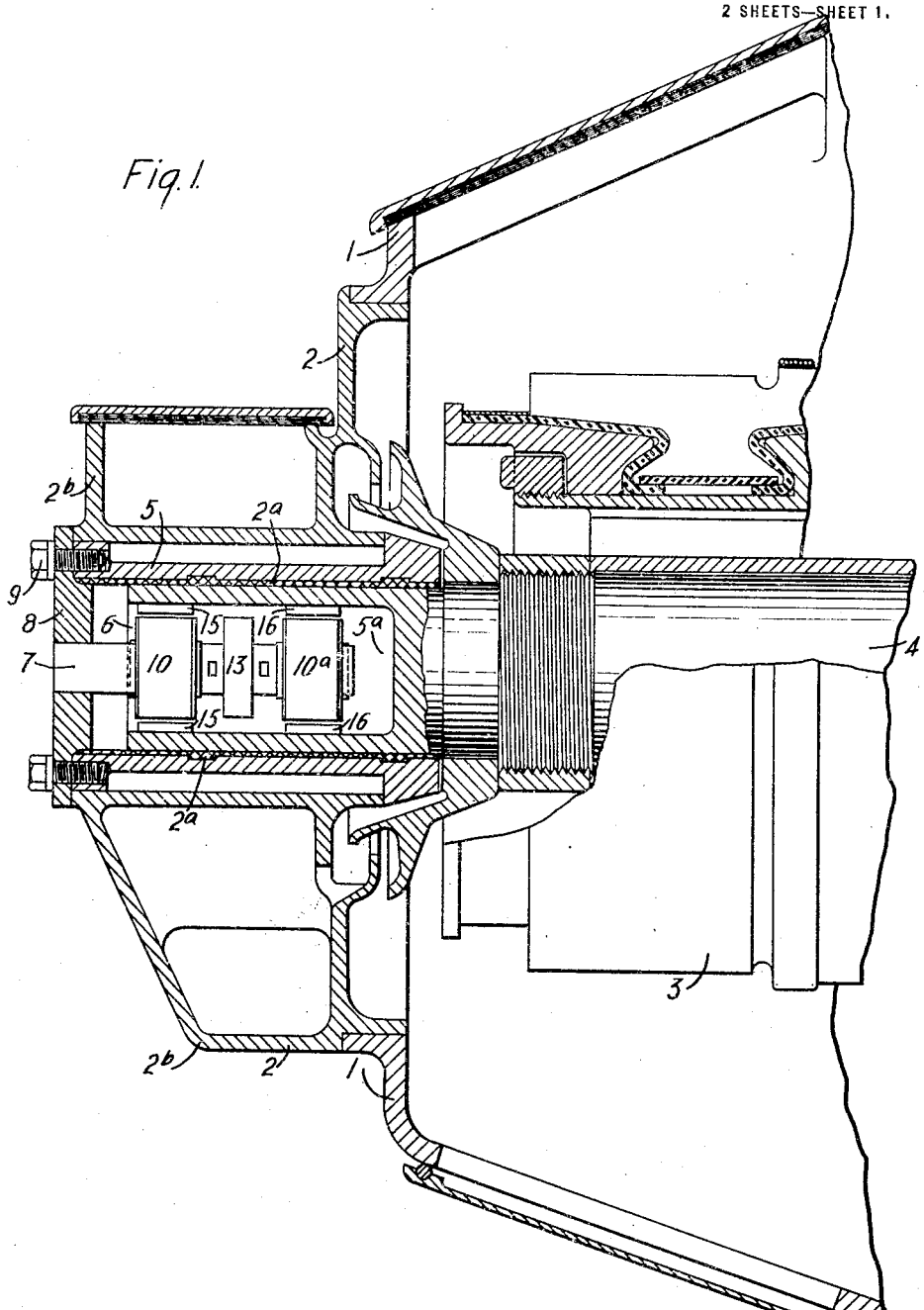

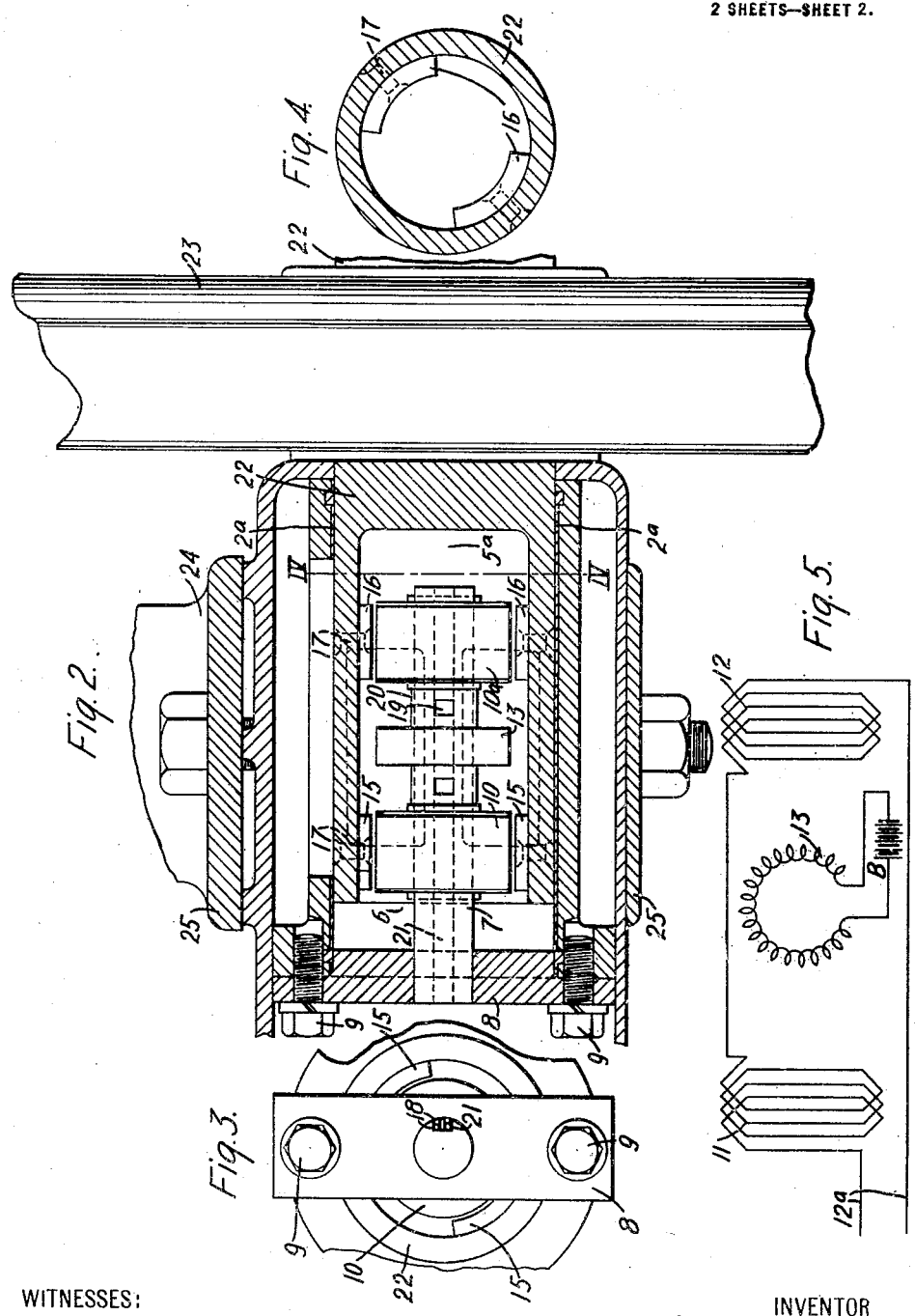

FRANCIS H. SHEPARD, OF NEW ROCHELLE, NEW YORK, AND RUDOLF E. HELLMUND, OF PITTSBURGH, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,258,154.   Specification of Letters Patent.   Patented Mar. 5, 1918.

Application filed December 4, 1914.   Serial No. 875,445.

*To all whom it may concern:*

Be it known that we, FRANCIS H. SHEPARD, a citizen of the United States, and a resident of New Rochelle, in the county of Westchester and State of New York, and RUDOLF E. HELLMUND, a subject of the German Empire, and a resident of Pittsburgh, in the county of Allegheny and State of Pennsylvania, have invented a new and useful Improvement in Dynamo-Electric Machines, of which the following is a specification.

Our invention relates to dynamo-electric machines, and it has special reference to machines of the type that are adapted to be driven by the armature shaft or wheel axle of an electric railway vehicle or the like.

One of the objects of our invention is to provide an apparatus of the above-indicated character which shall be compact and inexpensive in construction, which shall not require any additional space on the bottom of the vehicle, and which shall be removably located in an accessible position.

Another object of our invention is to provide a shaft or axle-driven generator which shall be free from belts, gears or equivalent power-transmitting devices, and which shall also be free from any moving electrical contact members.

Heretofore, axle-driven generators, the voltage of which depends upon the speed of the vehicle, have been employed in connection with suitable relays and adjustable resistances for automatically applying the vehicle brakes or cutting off energy to the vehicle, or both, when the vehicle speed exceeded a predetermined value. However, the apparatus has been expensive and bulky and has occupied valuable space on the bottom of the vehicle, inasmuch as the generator has been of the direct current type and has required separate supporting frames, brackets and gearing for associating the generator with the driven axle.

According to our invention, we provide an alternating current dynamo-electric machine which is disposed within a recess in one end of an armature shaft or wheel axle, the stator comprising a shaft which is supported from the bearing housing or the journal box, as the case may be, and is substantially centrally disposed in the end recess, and exciting and generating windings that are respectively suitably disposed, directly on, and on cores which are secured to, the shaft, and the rotor comprising sets of unwound field polar projections that are respectively adapted to influence the generating windings.

Our generator is thus compact in construction and is disposed in an out-of-the-way position which is, however, accessible when it is desired to repair the generator. Moreover, the generator requires no moving electrical contact members, since the machine is of the inductor type. We believe the particular type of machine described to be novel in its arrangement of parts, and we have pointed out the novel features thereof in certain of the appended claims.

In the accompanying drawing, Figure 1 is a view, partially in longitudinal section and partially in elevation, of a portion of a suitable dynamo-electric machine embodying our invention; Fig. 2 is a similar view of a wheel axle and associated parts that are constructed and arranged in accordance with our invention; Fig. 3 is a fragmentary view, in end elevation, of a portion of the apparatus shown in Figs. 1 and 2; Fig. 4 is a partial sectional view taken on the lines IV—IV of Fig. 2; and Fig. 5 is a diagrammatic view of one form of electrical connections, which may be employed in carrying out our invention.

Referring to Fig. 1 of the drawing, the portion of a dynamo-electric machine shown comprises a stator or frame member 1 of usual construction and embodying an end bearing housing 2, also of familiar form, and a suitable rotor 3 having a centrally disposed shaft 4, the end 5 of which is suitably disposed within the bearing housing 2, in accordance with customary practice, and has a longitudinally disposed end recess 5ª, within which is disposed a dynamo-electric machine 6 that is constructed in accordance with our invention.

The bearing housing comprises essentially a babbitted sleeve or axle brass 2ª, within which the end 5 of the shaft 4 is adapted to rotate, and an inclosing and supporting member 2ᵇ of a well-known type.

The dynamo-electric machine 6, best shown in Fig. 2, comprises a shaft 7 which is substantially centrally disposed in the recess 5ª; a supporting member or bracket 8 to which the end of the shaft 7 is rigidly secured and which is suitably attached to the axle brass 2ª, or to any other suitable portion of the bearing housing 2, by means of bolts 9 or other similar means (see Fig. 3); a pair of wound cores 10 and 10ª which are mounted on the shaft 7 and are provided with armature windings 11 and 12 (Fig. 5) of any suitable construction; an exciting coil 13 which is preferably disposed around the shaft 7 intermediate the cores 10 and 10ª; and a plurality of sets of unwound polar projections 15 and 16 which are respectively coöperatively associated with the cores 10 and 10ª and may be secured within recess 5ª by means of rivets or bolts 17 that extend through the annular walls of the shaft.

The generating windings 11 and 12 may be of any familiar form and are preferably disposed in series circuit relation, as shown in Fig. 5, in order to obtain a higher voltage across the machine terminals 12ª. The coil 13 may be of any type which is suitable for sending a magnetic flux through the annular walls of the shaft 22 and the cores 10 and 10ª, as indicated, for example, by the arrow-headed dotted lines in Fig. 2. The coil 13 may be connected to receive its energy in any suitable manner, as from a battery B.

The leads or terminal conductors 18 from the several windings of the dynamo-electric machine 4, are preferably threaded through openings 19 in suitable insulating tubes 20 that are respectively disposed between the exciting winding 13 and the generating cores 10 and 10ª, and extend through a longitudinal opening 21 in the shaft 7, as shown in Fig. 3.

Referring to Fig. 2, the apparatus shown comprises a wheel axle 22 which has the longitudinally disposed end recess 5ª, and is provided with suitable vehicle wheels 23 and a supporting journal box 24, and the dynamo-electric machine 6 which is disposed within the recess 5ª, as described in connection with Fig. 1.

The journal box 24, as shown, comprises essentially the babbitted sleeve or axle brass 2ª within which the end of the axle 22 is adapted to rotate, and inclosing and supporting members 25 of any suitable construction.

Inasmuch as the particular use for which the machine we have described is employed, is immaterial to our invention, we have not shown or described any control system to be used in connection therewith. It will be understood that various types of control systems, in particular, speed-indicating or signaling systems of any well-known type, may readily be associated with the dynamo-electric machine shown.

We do not wish to be restricted to the specific structural details or arrangement of parts herein set forth, but desire that only such limitations shall be imposed as are indicated in the appended claims.

We claim as our invention:

1. The combination with a shaft having an end recess, and stationary bearing means for said shaft, of a dynamo-electric machine disposed within said recess and having its rotor movable with the shaft.

2. The combination with a shaft having an end recess, and stationary bearing means surrounding the recessed end, of a dynamo-electric machine having its rotor secured to the shaft within said recess and having its stator disposed within the rotor and supported by said bearing means.

3. The combination with a shaft having an end recess, and a journal-box supporting the recessed end, of a magnetizable member substantially centrally disposed in said recess, means secured to said journal-box for supporting said member, exciting and generating windings disposed on the member, and a plurality of sets of field polar projections secured within said recess in operative proximity to said generating windings.

4. The combination with a shaft having an end recess, and a journal-box supporting the recessed end, of a magnetizable member substantially centrally disposed in said recess, means secured to said journal-box for supporting said shaft and holding it relatively stationary, a magnetizable core and an exciting winding disposed on said member, a generating winding disposed on said core, and a set of field polar projections secured within said recess and disposed in radial alinement with the generating winding core.

5. The combination with a rotatable shaft having a recess in the end thereof, of a dynamo-electric machine mounted within said recess.

6. The combination with a shaft having an end recess, of a dynamo-electric machine of the induction type mounted within the said recess.

7. The combination with a rotatable shaft having an end recess, of a plurality of polar projections secured within said recess, a stationary member mounted within said recess and provided with an exciting and a generating winding around which said polar projections are adapted to be rotated.

In testimony whereof, I have hereunto subscribed my name this 24th day of November, 1914.

FRANCIS H. SHEPARD.

Witnesses:
 WM. H. CAPEL,
 C. WESLEY POMEROY.

In testimony whereof, I have hereunto subscribed my name this 19th day of November, 1914.

RUDOLF E. HELLMUND.

Witnesses:
 A. L. BROOMALL,
 B. B. HINES.

Copies of this patent may be obtained for five cents each, by addressing the "Commissioner of Patents, Washington, D. C."